(12) United States Patent
Tanizawa et al.

(10) Patent No.: US 8,861,380 B2
(45) Date of Patent: Oct. 14, 2014

(54) TERMINAL, METHOD, AND COMPUTER PROGRAM PRODUCT FOR REGISTERING USER ADDRESS INFORMATION

(75) Inventors: Yoshimichi Tanizawa, Kanagawa (JP); Naoki Esaka, Kanagawa (JP); Tsutomu Shibata, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1391 days.

(21) Appl. No.: 12/202,704

(22) Filed: Sep. 2, 2008

(65) Prior Publication Data
US 2009/0116474 A1    May 7, 2009

(30) Foreign Application Priority Data
Nov. 1, 2007  (JP) ................................. 2007-284751

(51) Int. Cl.
   *H04L 12/26*   (2006.01)
   *H04L 29/06*   (2006.01)

(52) U.S. Cl.
   CPC ........ *H04L 65/1036* (2013.01); *H04L 65/1073* (2013.01); *H04L 63/0892* (2013.01); *H04L 63/16* (2013.01); *H04L 63/083* (2013.01); *H04L 63/08* (2013.01); *H04L 65/1006* (2013.01)
   USPC .......................................... 370/252; 370/338

(58) Field of Classification Search
   USPC ........................... 370/352, 465, 466, 365, 401
   See application file for complete search history.

(56) References Cited

U.S. PATENT DOCUMENTS

| | | | |
|---|---|---|---|
| 2004/0158735 A1* | 8/2004 | Roese | 713/200 |
| 2005/0136925 A1* | 6/2005 | Yamauchi | 455/435.1 |
| 2008/0004061 A1* | 1/2008 | Takeda | 455/518 |
| 2008/0130894 A1* | 6/2008 | Qj et al. | 380/277 |
| 2008/0219241 A1* | 9/2008 | Leinonen et al. | 370/352 |
| 2011/0274034 A1* | 11/2011 | Rautiola et al. | 370/328 |
| 2012/0027002 A1* | 2/2012 | Jones et al. | 370/338 |

FOREIGN PATENT DOCUMENTS

| | | |
|---|---|---|
| JP | 2006-67057 | 3/2006 |
| JP | 2006-352468 | 12/2006 |
| JP | 2007-206851 | 8/2007 |

OTHER PUBLICATIONS

IEEE Std 802.1X—2004 IEEE standard for Local and metropolitan area netowrks; Dec. 13, 2004.*
Tanizawa, U.S. Appl. No. 12/230,575, filed Sep. 2, 2008, entitled Apparatus, Method, and Computer Program for Registering User Address Information.

* cited by examiner

*Primary Examiner* — Gary Mui
(74) *Attorney, Agent, or Firm* — Finnegan, Henderson, Farabow, Garrett & Dunner, L.L.P.

(57) ABSTRACT

The transferring unit transfers a message received from a PC or a network to a designated destination address. The judging unit judges whether an authentication message including the identification information of the user and a grant message indicating that the user is authenticated are transferred. The identification information acquiring unit acquires the identification information from the transferred authentication message. The SIP message processing unit creates a registration message that includes the address information of the user having the acquired identification information and transmits the created registration message to the SIP server when the grant message is transferred.

10 Claims, 11 Drawing Sheets

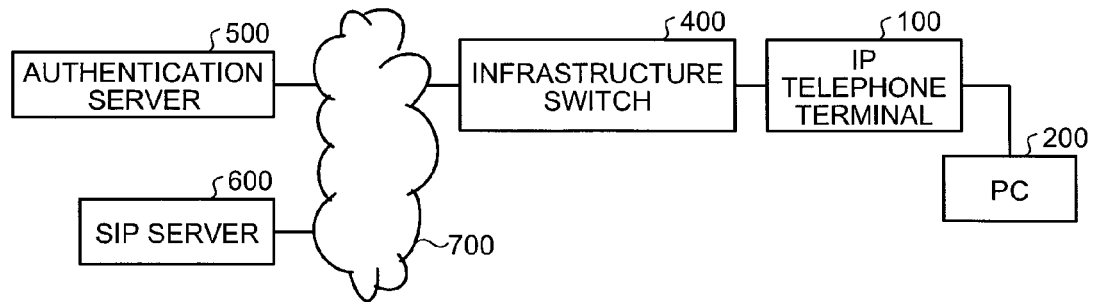
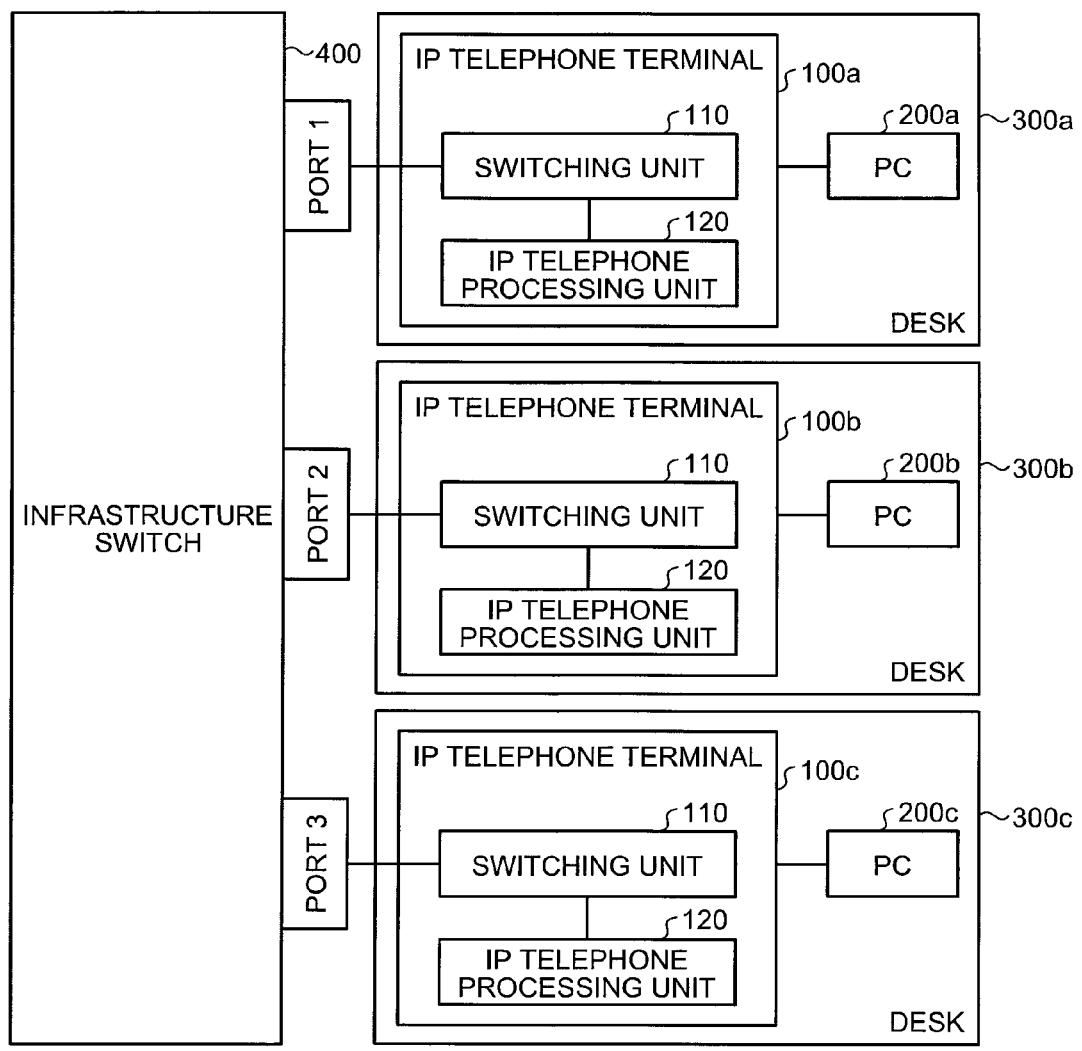

```
Register sip: registrar.example.com SIP/2.0
Max-Forwards: 70
Via: SIP/2.0/UDP 192.168.0.101; branch=z9hG4bK74aj7
From: <sip: alice@example.com>; tag=xxxxx
To: <sip: alice@example.com>
Call-ID: 2222@192.168.0.101
CSeq: 33 REGISTER
Contact: <sip: alice@192.168.0.101>
Content-Length: 0
```

Register sip: registrar.example.com SIP/2.0
Max-Forwards: 70
Via: SIP/2.0/UDP 192.168.0.101; branch=z9hG4bK74aj7
From: <sip: alice@example.com>; tag=xxxxx
To: <sip: alice@example.com>
Call-ID: 2222@192.168.0.101
CSeq: 33 REGISTER
Contact: <sip: alice@192.168.0.101>; expires=3600
Content-Length: 0

TERMINAL, METHOD, AND COMPUTER PROGRAM PRODUCT FOR REGISTERING USER ADDRESS INFORMATION

CROSS-REFERENCE TO RELATED APPLICATIONS

This application is based upon and claims the benefit of priority from the prior Japanese Patent Application No. 2007-284751. filed on Nov. 1, 2007; the entire contents of which are incorporated herein by reference.

BACKGROUND OF THE INVENTION

1. Field of the Invention

The present invention relates to a terminal, a method, and a computer program product for registering address information of users who use an IP telephone function with a server apparatus.

2. Description of the Related Art

Network access authentication protocols such as the Institute of Electrical and Electronic Engineers (IEEE) 802.1X and the Protocol for Carrying Authentication for Network Access (PANA) are widely known as protocols used for granting access to a certain network system to authenticated terminals only.

In accordance with the IEEE 802.1X standard (hereinafter, "802.1X authentication"), port-based authentication and access grant is conducted onto a connected device. The 802.1X authentication is usually conducted between an infrastructure switch and a device directly connected to the switch.

JP-A 2006-352468 (KOKAI) suggests a technology of granting access to all the terminals that are connected by way of a switch or the like to a port that satisfies the IEEE 802.1X standard, by providing the 802.1X authentication to any one of the terminals.

JP-A 2006-67057 suggests a technology of providing individual terminals with the 802.1X authentication and access grant based on their MAC addresses when multiple terminals are connected to a port that satisfies the IEEE 802.1X standard by way of a switch or the like.

Recently, an IP telephone system has been widely known in which a telephone network is realized on the IP network by use of Session Initiation Protocol (SIP). The SIP is a signaling procedure positioned between communication devices to control and relay communications. IP telephone terminals used in the IP telephone system are cabled by Ethernet or the like, and the telephone system is realized by SIP-based call control and media transfer on the IP network.

When a user starts using an IP telephone terminal, the user's SIP address needs to be registered with the IP telephone terminal. The SIP address registration is a process of associating the SIP address of the user with the SIP address of the IP telephone terminal. In this process, the user inputs a user ID, password and the like to the IP telephone terminal. The SIP address registering process has to be performed so that incoming calls for the user can be accurately received, callers can be accurately identified, and extended functions of the IP telephone terminal (such as abbreviated dialing) can be set up for each user. For the sake of users' convenience, the setting may be established to allow for incoming and outgoing calls without requesting the user to input a user ID or password, assuming that the SIP addresses have been registered for the default user.

An office-use IP telephone terminal often incorporates therein a switching unit provided with an uplink and a downlink to simplify the cabling around the desk. In particular, the uplink of the IP telephone terminal is connected to the port of the infrastructure switch, and the downlink of the IP telephone terminal is connected to a regular PC or the like. With such connections, the IP telephone terminal and the PC can be used with a port assigned to each desk.

In a free-address office or the like in which desks are not assigned to individual users in a fixed manner, only IP telephone terminals are placed on desks in a fixed manner to be connected to an infrastructure network. Then, a user makes a connection to the infrastructure network by way of the IP telephone terminal from a portable notebook PC or the like that is assigned to each individual. For this reason, the user has to have the connected PC authenticated and also to register a SIP address with the IP telephone terminal to which the PC is connected.

However, in the environment where a PC is connected to the infrastructure network by way of an IP telephone terminal, the SIP address registration has to be conducted on the IP telephone terminal, separately from the authentication conducted on the PC. This complicates the operation of using the IP telephone terminal.

More specifically, when the user wishes to use an IP telephone terminal, the user has to (1) connect the PC to the downlink of the IP telephone terminal; (2) initiate the 802.1X authentication on the infrastructure network from the connected PC to obtain access grant; and (3) register the SIP address of the user by operating the IP telephone terminal.

SUMMARY OF THE INVENTION

According to one aspect of the present invention, an IP telephone terminal that offers an IP telephone function by mediating a connection between an external terminal and a network and registering address information of a user with a server apparatus connected by way of the network, the terminal includes a transferring unit that transfers a message received from the external terminal and the network to a destination address designated in the received message; a first judging unit that judges whether an authentication message, that is used for authentication of the user of the external terminal and includes identification information of the user, is transferred from the external terminal to the network by way of the transferring unit; an identification information acquiring unit that acquires the identification information from the authentication message when the authentication message is transferred by way of the transferring unit; a second judging unit that judges whether a grant message indicating that the user is authenticated is transferred from the network to the external terminal by way of the transferring unit; and a message processing unit that creates a registration message to register the address information of the user having the acquired identification information with the server apparatus, and transmits the registration message to the server apparatus, when the grant message is transferred by way of the transferring unit.

According to another aspect of the present invention, an address registering method executed by an IP telephone terminal that offers an IP telephone function by mediating a connection between an external terminal and a network and registering address information of a user with a server apparatus connected by way of the network, the method includes transferring a message received from the external terminal and the network to a destination address designated in the received message; judging whether an authentication message, that is used for authentication of the user of the external terminal and includes identification information of the user, is transferred from the external terminal to the network; acquiring the identification information from the authentication message when the authentication message is transferred; judging whether a grant message indicating that the user is authenticated is transferred from the network to the external terminal; and creating a registration message that includes the address message to be registered and that is to register the address information of the user having the acquired identification information with the server apparatus, and transmitting the registration message to the server apparatus, when the grant message is transferred.

A computer program product according to still another aspect of the present invention causes a computer to perform the method according to the present invention.

BRIEF DESCRIPTION OF THE DRAWINGS

FIG. 1 is a diagram showing a network structure of an IP telephone system according to a first embodiment of the present invention;

FIG. 2 is a diagram showing an example of a connection arrangement of IP telephone terminals;

DETAILED DESCRIPTION OF THE INVENTION

Figure 3:
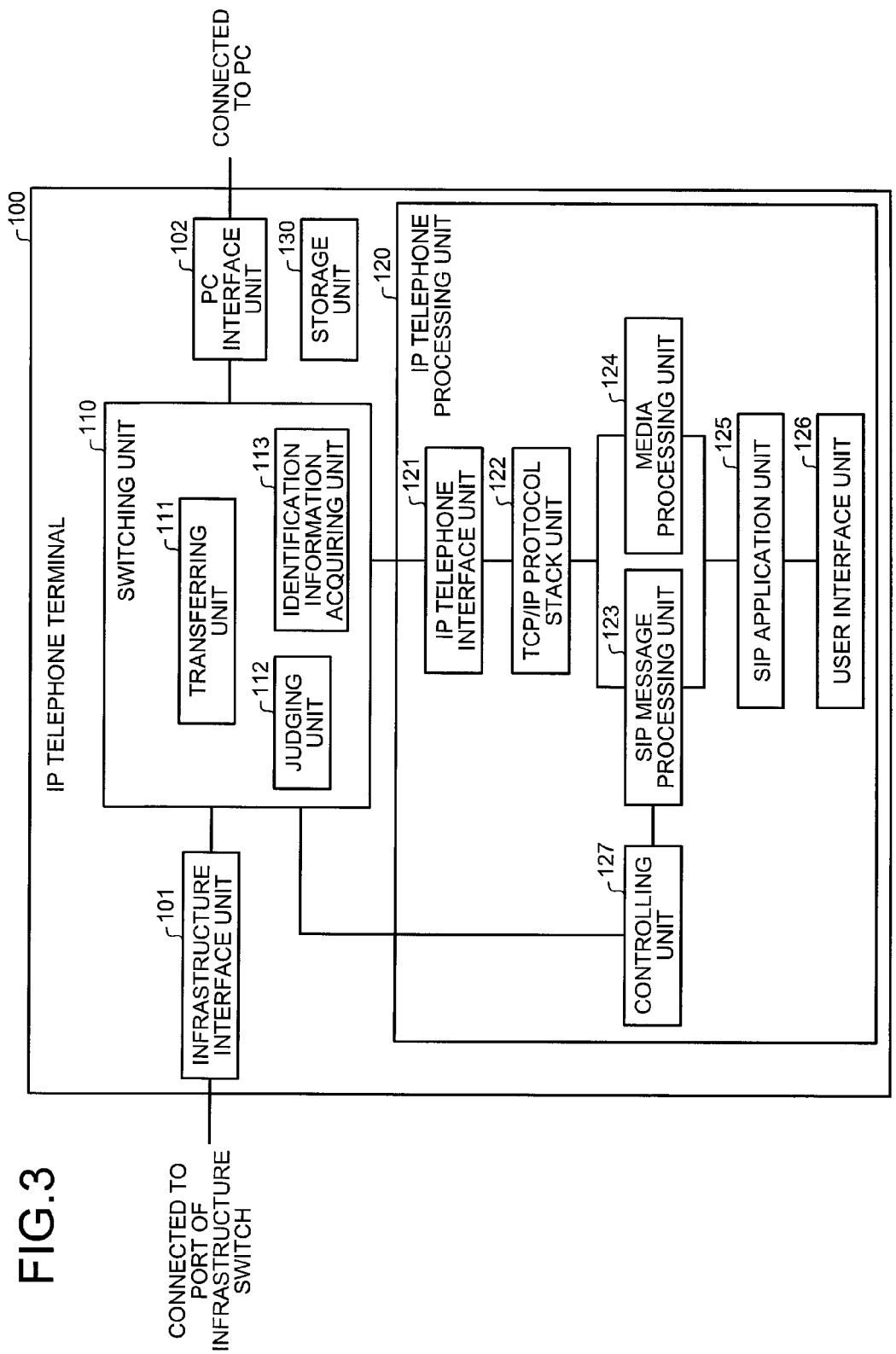
FIG. 3 is a block diagram showing a detailed structure of an IP telephone terminal according to the first embodiment.

Exemplary embodiments of a terminal, a method, and a computer program product according to the present invention are explained in detail below with reference to the attached drawings.

An IP telephone terminal according to a first embodiment acquires a user ID that identifies the user of a PC from an authentication message sent by a PC that interfaces with a network, and registers a SIP address that is generated from the acquired user ID with a SIP server when the authentication is successfully made.

As illustrated in FIG. 1, an IP telephone system according to the first embodiment includes an IP telephone terminal 100, a PC 200, an infrastructure switch 400, an authentication server 500, and a SIP server 600. Furthermore, the infrastructure switch 400, the authentication server 500, and the SIP server 600 are connected to one another by way of an infrastructure network 700 such as a local area network (LAN).

The IP telephone terminal 100 offers an IP telephone function to a user who uses a desk space. The IP telephone terminal 100 adopts the SIP for call control. The IP telephone terminal 100 includes a dialing unit and a headset (loudspeaker and microphone) to provide an ordinary telephone function. In other words, the user can use functions similar to those of a regular telephone, such as originating a call by dialing a destination address on the dialing unit, and receiving a call that designates the IP telephone terminal 100 and speaking over a headset. To use the following functions, however, the desk space user needs to have the user SIP address registered by use of the dialing unit of the IP telephone terminal 100:

(1) Originating a call by specifying the address of the desk space user as a caller;
(2) Receiving a call that designates the desk space user;
(3) Using IP telephone extended functions available for the desk space user (such as abbreviated dialing, voice mail setting, transfer setting for each individual user, and call block setting for each individual user).

The IP telephone terminal 100 includes an uplink and a downlink as connection interfaces to establish connections with Ethernet (trademark). More specifically, the IP telephone terminal 100 has the uplink connected to a port of the infrastructure switch 400 and the downlink connected to the PC 200.

The IP telephone terminal 100 according to the present embodiment executes the IEEE 802.1X authentication of the desk space user between the PC 200 and the infrastructure switch 400. The IP telephone terminal 100 is provided with a function of registering the user's SIP address when network access is granted so that the IP telephone function becomes available to the user. The function and structure of the IP telephone terminal 100 will be described later.

The PC 200 is a terminal device that the user brings to the desk space and connects to the downlink of the IP telephone terminal 100. By connecting the PC 200 to the downlink of the IP telephone terminal 100, the network function can be performed. To make the network function available to the user, however, the IEEE 802.1X authentication has to be conducted between the PC 200 and the infrastructure switch 400 to have the network access granted. For this reason, the PC 200 is provided with the IEEE 802.1X Supplicant function. When the PC 200 is connected to the downlink of the IP telephone terminal 100, the user inputs the user ID and password to the PC 200 to start the IEEE 802.1X authentication.

In FIG. 1, a single IP telephone terminal 100 and a single PC 200 are illustrated, but in a usual structure, a number of IP telephone terminals 100 and PCs 200 are connected to the infrastructure network 700 by way of the infrastructure switch 400.

The infrastructure switch 400 is a switching device operated as a part of an office network infrastructure, which corresponds to an edge device connecting the PC 200 and the IP telephone terminal 100. The infrastructure switch 400 is provided with an IEEE 802.1X authenticator function to perform network access authentication on a connected terminal. The infrastructure switch 400 assigns a port to each desk space and provides it with an Ethernet cable.

The infrastructure switch 400 may be configured to perform the 802.1X authentication on the IP telephone terminal 100 in advance or to omit the 802.1X authentication on the IP telephone terminal 100. When it is omitted, the infrastructure switch 400 is configured to have the IP telephone terminal 100 and the PC 200 connected to the same port but individually provide them with connection settings and connection grant. Such an operation may be realized in accordance with the methods suggested in JP-A 2006-352468 (KOKAI) and JP-A 2006-67057 (KOKAI), for example.

The authentication server 500 executes, with the infrastructure switch 400, an authenticating process on the user based on an authentication protocol such as the RADIUS protocol.

The SIP server 600 is a device with which the user SIP address is registered so that the IP telephone function of the IP telephone terminal 100 becomes available to the user.

The connection of the IP telephone terminals 100 is further explained below. FIG. 2 is a diagram showing an example of a connection arrangement of the IP telephone terminals 100a to 100c placed in desk spaces of an office. In this arrangement, the IP telephone terminals 100a to 100c are positioned on desks 300a to 300c. Portable PCs 200a to 200c that are individually assigned to the users are also positioned on the desks 300a to 300c.

Each of the IP telephone terminals 100 includes an IP telephone processing unit 120 that provides the IP telephone function, and a switching unit 110 that routes messages exchanged among the infrastructure switch 400, the IP telephone processing unit 120, and the PC 200 in accordance with the addresses of the messages. Each of the PCs 200 is connected to the infrastructure switch 400 by way of the switching unit 110.

The function and structure of the IP telephone terminal 100 are discussed below in detail. As illustrated in FIG. 3, the IP telephone terminal 100 includes an infrastructure interface unit 101, a PC interface unit 102, the switching unit 110, the IP telephone processing unit 120, and a storage unit 130.

The storage unit 130 stores therein identification information acquired by an identification information acquiring unit 113 (discussed later) of the switching unit 110. The storage unit 130 may be formed of any generally used memory medium such as a hard disk drive (HDD), an optical disk, a memory card, and a random access memory (RAM).

The infrastructure interface unit 101 is arranged at the end of the Ethernet cable connection with the infrastructure switch 400 to offer a network interface function. More specifically, the infrastructure interface unit 101 sends out frames addressed to the infrastructure network 700, and also receives frames addressed to the IP telephone terminal 100 and the PC 200 and transfers the frames to the switching unit 110.

The PC interface unit 102 is arranged at the end of the Ethernet cable connection with the PC 200 to offer a network interface function. More specifically, the PC interface unit 102 sends out frames addressed to the PC 200, and also receives frames addressed to the infrastructure network 700 and the IP telephone terminal 100 and transfers the frames to the switching unit 110.

The switching unit 110 is an Ethernet switch that transmits and receives Ethernet frames in accordance with their destination addresses. To describe a detailed structure, the switching unit 110 includes a transferring unit 111, a judging unit 112, and the identification information acquiring unit 113.

The transferring unit 111 transfers frames to three interfacing units, the infrastructure interface unit 101, the PC interface unit 102, and an IP telephone interface unit 121 of the IP telephone processing unit 120 (discussed later), in accordance with the destination addresses of the frames.

The judging unit 112 monitors Ethernet frames transferred between the PC interface unit 102 and the infrastructure interface unit 101, and determines whether a certain frame is transferred. More specifically, the judging unit 112 monitors information of 802.1X frames transferred between the PC interface unit 102 and the infrastructure interface unit 101. The judging unit 112 judges whether, for example, an EAP-Request/Identity frame that is predetermined as an authentication message including the user ID is transferred. In addition, the judging unit 112 judges whether, for example, an EAP-Success frame predetermined as a grant message notifying that the 802.1X authentication of the user is successfully made is transferred.

When the judging unit 112 judges that the authentication message is transferred, the identification information acquiring unit 113 acquires the user identification information from the authentication message. More specifically, when the EAP-Request/Identity frame is transferred from the PC 200 to the infrastructure network 700, the identification information acquiring unit 113 acquires the user identification information from this frame. The structure of the EAP-Request/Identity frame will be described later.

The identification information acquiring unit 113 stores the acquired identification information in the storage unit 130. The stored identification information is referred to by a SIP message processing unit 123, which will be described later, when a SIP Register-Request message including the identification information is generated.

To describe a detailed structure, the IP telephone processing unit 120 includes the IP telephone interface unit 121, a TCP/IP protocol stack unit 122, a SIP message processing unit 123, a media processing unit 124, a SIP application unit 125, a user interface unit 126, and a controlling unit 127.

The IP telephone interface unit 121 is a network interface internally arranged in the IP telephone terminal 100. The IP telephone interface unit 121 transfers frames addressed to the infrastructure network 700 and the PC 200 to the switching unit 110, and receives frames addressed to the IP telephone terminal 100 from the switching unit 110. Furthermore, the IP telephone interface unit 121 transfers frames addressed to the IP telephone terminal 100 to the TCP/IP protocol stack unit 122.

The TCP/IP protocol stack unit 122 performs a TCP/IP protocol process to realize the IP telephone function. More specifically, the TCP/IP protocol stack unit 122 executes the TCP/IP protocol process that is necessary for the SIP message processing unit 123 to transmit and receive SIP messages and for the media processing unit 124 to transmit and receive media.

The SIP message processing unit 123 executes a call control by use of the SIP to realize the IP telephone function. For example, the SIP message processing unit 123 creates a SIP message in accordance with the instruction from the SIP application unit 125, and transmits the SIP message by way of the TCP/IP protocol stack unit 122. More specifically, when the judging unit 112 judges that the grant message notifying that the 802.1X authentication is successfully made is transferred, the SIP message processing unit 123 creates the SIP Register-Request message to make the IP telephone function available to the user having the identification information stored in the storage unit 130, and sends the message to the SIP server 600.

The SIP message processing unit 123 identifies the SIP message received from the TCP/IP protocol stack unit 122, and notifies the SIP application unit 125 of any necessary call control information.

The media processing unit 124 executes a media process of processing media information including sound and video information to realize the IP telephone function. More specifically, the media processing unit 124 transmits media packets (RTP/RTCP) by way of the TCP/IP protocol stack unit 122, in accordance with the instruction of the SIP application unit 125. The media processing unit 124 also identifies media packets received from the TCP/IP protocol stack unit 122, and notifies the SIP application unit 125 of the media information.

The SIP application unit 125 is an application that realizes the IP telephone function by executing the call control and the media process. The SIP application unit 125 uses the SIP message processing unit 123 and the media processing unit 124 for the call control and the media process. The SIP application unit 125 is operated by the user by way of the user interface unit 126.

The user interface unit 126 offers a user interface with which the user can use the IP telephone function. More specifically, the user interface unit 126 includes a dial, a headset (a loudspeaker and a microphone), a calling speaker, a light emitting diode (LED), a liquid crystal display (LCD), and the like. The user interface unit 126 generates SIP application control information that is necessary to use the IP telephone function, based on the information of the user's operation, and controls the SIP application unit 125. For example, the user interface unit 126 controls the SIP application unit 125 by generating the SIP application control information necessary for an outgoing call process, based on the operation information that is a dialed number.

The controlling unit 127 controls a process of registering the user's SIP address, upon receiving from the judging unit 112 the 802.1X authentication state of the user of the PC 200. More specifically, when it is judged that network access is granted for the user of the PC 200 in the 802.1X authentication, the controlling unit 127 notifies the SIP message processing unit 123 of the identification information of the user authenticated in the 802.1X authentication. The notified SIP message processing unit 123 starts creating a SIP message necessary in a SIP address registering process, by which the IP telephone terminal 100 becomes available to the authenticated user. The function of the controlling unit 127 may be realized within the SIP message processing unit 123.

Next, the SIP address registering process executed by the IP telephone terminal 100 according to the first embodiment is explained with reference to FIG. 4.

First, the PC 200 executes the 802.1X authentication with the infrastructure switch 400 by way of the IP telephone terminal 100 (steps S401 to S417). In the 802.1X authentication, certain EAPOL frames are exchanged between the PC 200 and the infrastructure switch 400.

When the EAPOL frames are exchanged, the IP telephone terminal 100 receives an EAPOL frame sent by the PC 200 at the PC interface unit 102, and transfers the received frame from the switching unit 110 to the infrastructure interface unit 101. On the other hand, the IP telephone terminal 100 receives an EAPOL frame sent by the infrastructure switch 400 at the infrastructure interface unit 101, and transfers the received frame from the switching unit 110 to the PC interface unit 102. When the switching unit 110 transfers the EAPOL frame, the judging unit 112 monitors the content of the frame that is transferred. At a specific timing that will be described later, the judging unit 112 acquires the EAPOL frame information and notifies the controlling unit 127 of the information.

The steps of the process are explained in detail below. The 802.1X authentication is initiated by the PC 200 sending an EAPOL-Start frame to the infrastructure switch 400 (steps S401 and S402). The infrastructure switch 400 that receives this frame sends an EAP-Request/Identity frame to the PC 200 (steps S403 and S404).

A user ID needs to be included in a frame responding to the received EAP-Request/Identity frame. The PC 200 that receives the frame therefore prompts the user to input a user ID, a password, and the like by use of a GUI or the like.

Thereafter, the PC 200 sends an EAP-Response/Identity frame that includes the input user ID to the infrastructure switch 400 (step S405).

Figure 5:
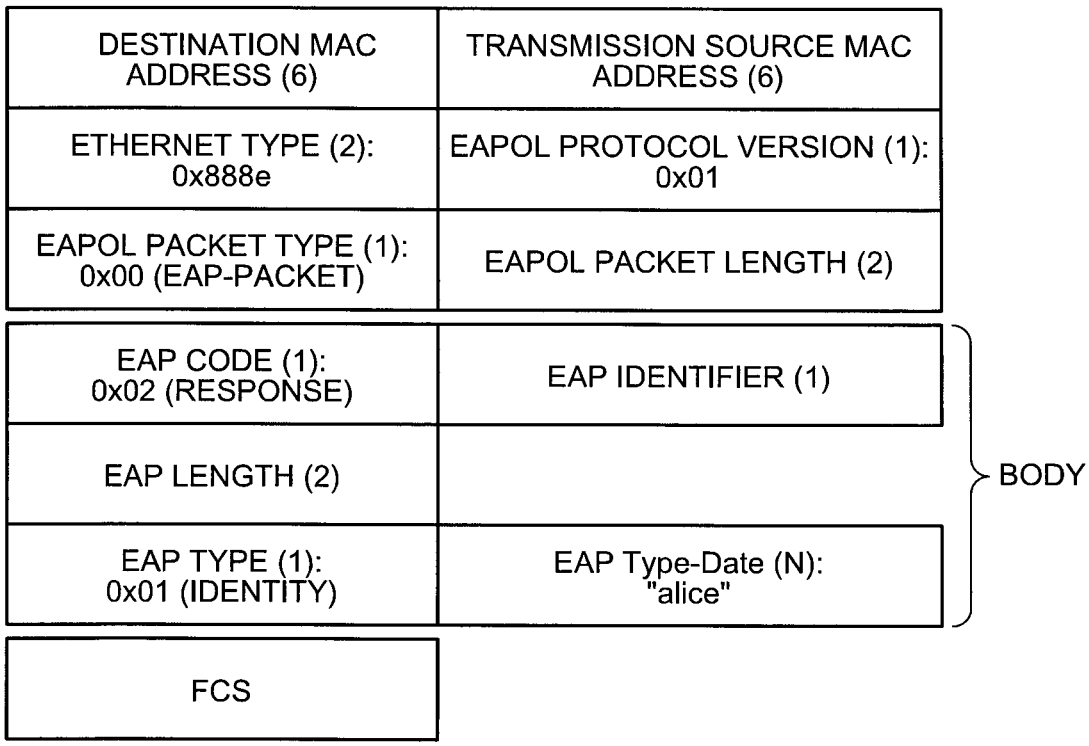
FIG. 5 is a diagram showing an example structure of an EAP-Response/Identity frame.

It is assumed here that the user ID of the user of the PC 200 is "alice". As illustrated in FIG. 5, the EAP-Response/Identity frame includes a destination MAC address, a source MAC address, an Ethernet type, the version of the EAPOL protocol, an EAPOL packet type, the EAPOL packet length, a body, and a frame check sequence (FCS). In accordance with the EAP, the body includes the EAP code, the EAP identifier, the EAP length, the EAP type, and the EAP type-data.

In the EAP-Response/Identity frame, the MAC address of the infrastructure switch 400 is set as the destination MAC address, and the MAC address of the PC 200 is set as the source MAC address. The Ethernet type is "0x888e" that indicates EAPOL. The version of the EAPOL protocol is always "0x01". The EAPOL packet type is "0x00" that corresponds to the EAP-packet. This shows that the frame is an EAPOL frame that carries an EAP as the body. The EAPOL packet length denotes the length of EAPOL frame. The FCS is used to check the Ethernet frame. Further, the EAP code is "0x02" that indicates the EAP-Response. As the EAP identifier, the same value as the value that is set in the corresponding EAP-Request/Identity frame that has been received. The EAP length indicates the length of the EAP. As the EAP type, "0x01" is set to indicate that the next EAP type-data includes identity information, which is the identification information of the user. For the EAP type-data, "alice" is set as the identity information. In FIG. 5, the number of bytes of each element included in the frame is given in the parentheses following the name of the element.

When a method with a Protected Identity Exchange function is adopted as an authentication EAP method, the user ID does not have to be included in the EAP Type-Data, but a method specific to the EAP may be adopted for the exchange. According to the present embodiment, any authentication EAP method can be adopted. In the following explanation, however, it is assumed that the value of the user ID is included in the EAP Type-Data, whichever authentication EAP method is used.

Figure 4:
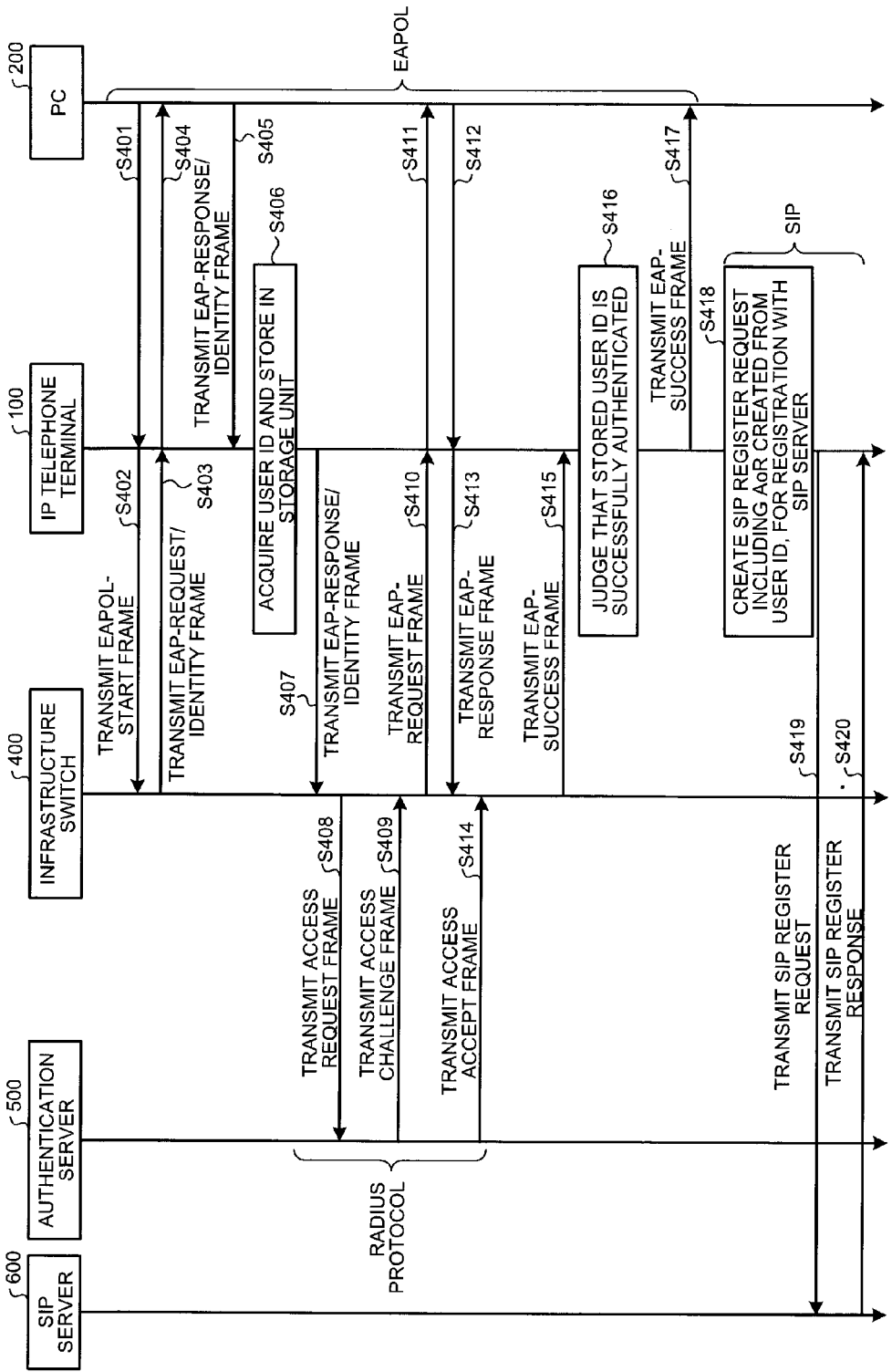
FIG. 4 is a sequence diagram showing an overview of a SIP address registering process according to a first embodiment.

In FIG. 4, when the PC interface unit 102 of the IP telephone terminal 100 receives the EAP-Response/Identity frame that includes the user ID of the user of the PC 200, the switching unit 110 transfers this frame to the infrastructure interface unit 101. At this step, the judging unit 112 judges that the frame is an EAP-Response/Identity frame that includes the user ID, by referring to the header of the frame, the EAP Codes of the body, and the like. Then, the identification information acquiring unit 113 acquires, as the identification information of the user, the user ID included in the frame as the identity of the EAP Type-Data, and stores the acquired information in the storage unit 130 (step S406).

The EAP-Response/Identity frame is transferred to the infrastructure switch 400 via the infrastructure interface unit 101 (step S407).

During the 802.1X authentication with the PC 200, the infrastructure switch 400 exchanges messages with the authentication server 500 in accordance with an authentication protocol such as the RADIUS protocol (steps S408 and S409). For example, the infrastructure switch 400 sends an Access Request frame, which is a RADIUS protocol authentication request, to the authentication server 500.

Thereafter, the infrastructure switch 400 and the PC 200 continue to exchange the EAP-Request frame and the EAP-Response frame for the 802.1X authentication (steps S410 to S413). In FIG. 4, those frames are illustrated as being exchanged only once, but the frames may be exchanged twice or more if necessary.

When the authentication of the user is made by the authentication server 500 and an Access Accept frame is transmitted (step S414), the infrastructure switch 400 sends the EAP-Success frame to the PC 200 (step S415).

Figure 6:
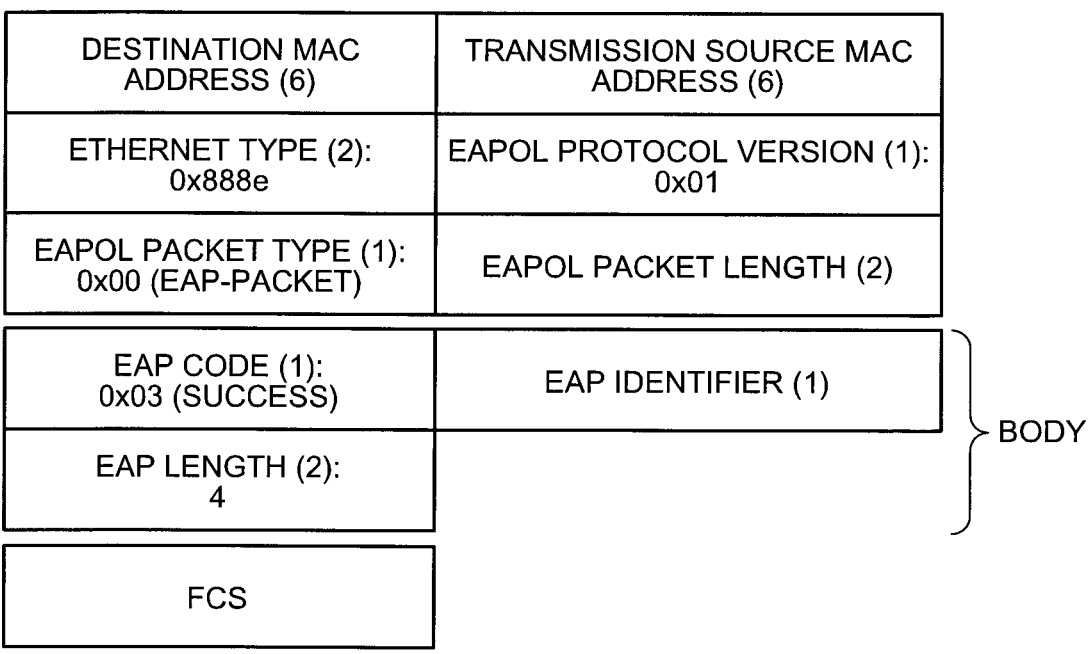
FIG. 6 is a diagram showing an example structure of an EAP-Success frame.

As illustrated in FIG. 6, the EAP-Success frame includes a destination MAC address, a source MAC address, an Ethernet type, the version of the EAPOL protocol, the EAPOL packet type, the EAPOL packet length, the body, and the FCS. The body includes an EAP Code, an EAP Identifier, and an EAP Length, in accordance with the EAP.

In the EAP-Success frame, the destination MAC address is the MAC address of the PC 200, and the source MAC address is the MAC address of the infrastructure switch 400. The Ethernet type is "0x888e" that indicates the EAPOL. The version of the EAPOL protocol is always "0x01". The EAPOL packet type is "0x00" that corresponds to the EAP-Packet. The EAPOL packet length shows the length of the EAPOL frame. The FCS is used to check the Ethernet frame. The EAP Code is "0x03" that corresponds to EAP-Success. For the EAP Identifier, the same value as the one set for the corresponding received EAP-Request frame is stored. The EAP Length shows the length of the EAP.

In FIG. 4, when the infrastructure interface unit 101 of the IP telephone terminal 100 receives the EAP-Success frame, the switching unit 110 transfers this frame to the PC interface unit 102. At this step, the judging unit 112 judges that the frame is an EAP-Success frame by referring to the header of the frame and the EAP Code of the body. In this manner, the judging unit 112 judges that the authentication of the user having the user ID stored in the storage unit 130 is successfully made (step S416).

When the authentication of the user is successfully made, the infrastructure switch 400 grants network access to the PC 200. The switching unit 110 transfers the EAP-Success frame to the PC 200 (step S417). Then, the PC 200 notifies the user, by use of the GUI, that the network access is granted.

When it is judged that the user is authenticated, the judging unit 112 notifies the controlling unit 127 of the 802.1X authenticated user ID. The controlling unit 127 sends an instruction of registering a SIP address to the SIP message processing unit 123.

As mentioned before, it is assumed here that the 802.1X authentication may not be required for the IP telephone terminal 100, or when it is required, the 802.1X authentication has already been established and the network access has already been granted at this point.

The SIP message processing unit 123 creates a SIP Register Request message having an AoR created from the user ID in accordance with the instruction from the controlling unit 127 (step S418).

According to the present embodiment, it is assumed that the IP telephone terminal 100 is configured to create a SIP address for the address registration that makes the IP telephone terminal 100 available from the user ID for the IEEE 802.1X authentication that makes the PC 200 available. For example, an AoR may be created by adding a SIP address domain (a character string following the symbol "@") to the user ID, by use of the information set for the IP telephone terminal 100, and used as a SIP address.

Figures 7, 8:
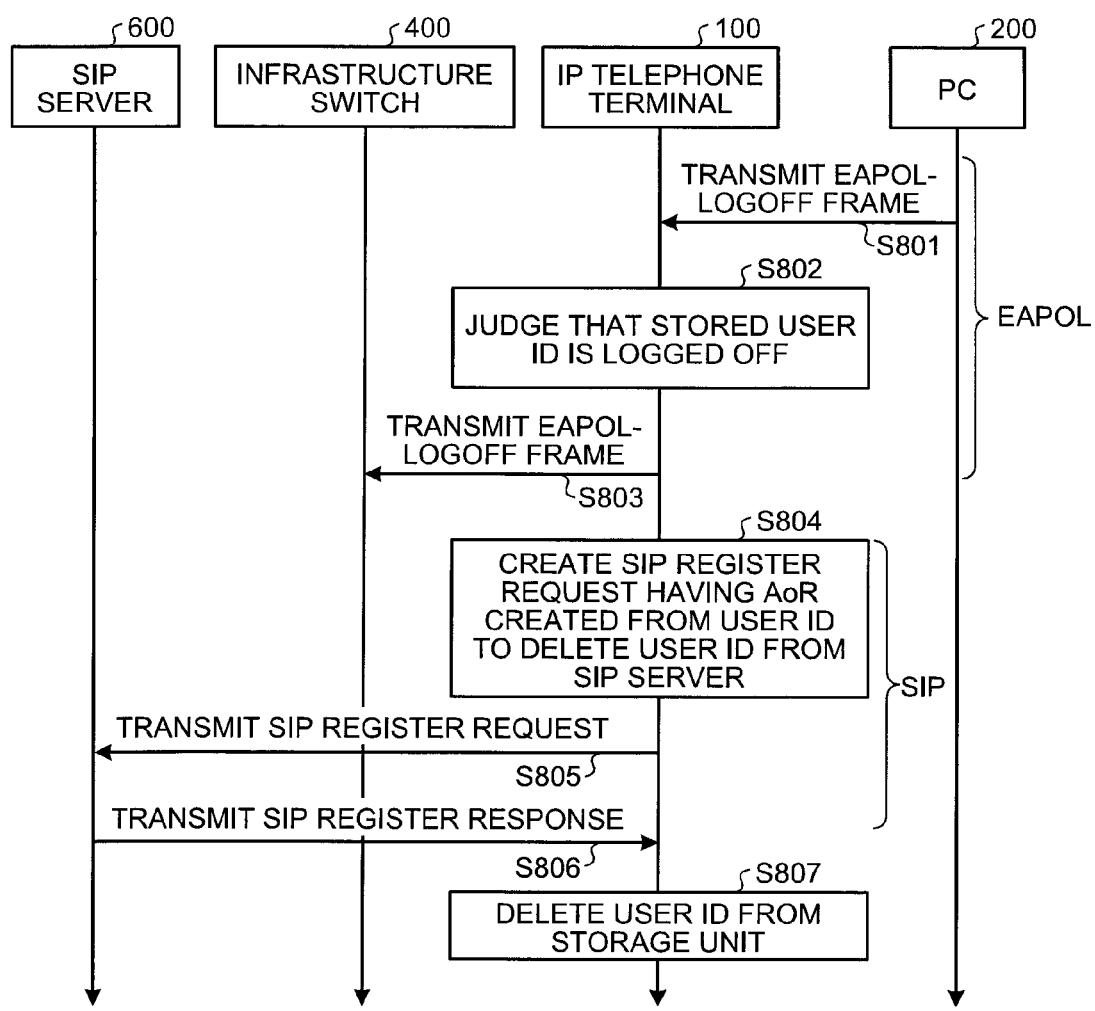
FIG. 7 is a diagram showing an example structure of a SIP Register-Request message.
FIG. 8 is a sequence diagram showing an overview of a SIP address deleting process according to the first embodiment.

FIG. 7 is a diagram showing an example structure of the SIP Register-Request message created by the SIP message processing unit 123. The IP address assigned here to the IP telephone terminal 100 is "192.168.0.101". The name of the SIP server 600, "registrar.example.com", is stored in advance in the storage unit 130 or the like so that it can be referred to when the message is created.

The Request-URI in FIG. 7 is the SIP address of the SIP server 600, "sip:registrar.example.com". The "From" header and "To" header are both an AoR that is to be set to the IP telephone terminal 100, "alice@example.com". The "Contact" header is the contact address (alice@192.168.0.101) for "alice@example.com" indicated by the IP address of the IP telephone terminal 100.

The AoR is a SIP address with which the user is identified within the SIP system. The contact address is a SIP address that includes the IP address actually assigned to the IP telephone terminal 100 and the user part of the AoR, combined with a symbol "@" added in between. The contact address is stored in the SIP server 600 in association with the AoR.

In FIG. 4, the SIP message processing unit 123 of the IP telephone terminal 100 sends a created SIP Register-Request message to the SIP server 600 (step S419). After registering the SIP address, the SIP server 600 sends a SIP Register-Response message to the IP telephone terminal 100 (step S420). When the IP telephone terminal 100 receives the SIP Register-Response message, the SIP address registering process is completed.

Thereafter, any call addressed to the user's AoR is converted to the contact address by way of the SIP server 600, and received by the corresponding IP telephone terminal 100.

With the above sequence, when the user of the PC 200 executes the 802.1X authentication of the PC 200 by operating the PC 200, the SIP address registration that makes the IP telephone terminal 100 available is also completed.

The SIP address deleting process performed by the IP telephone terminal 100 according to the first embodiment is explained below with reference to FIG. 8. The SIP address deleting process is a process of deleting the SIP address from the SIP server 600 in response to the expiration of the 802.1X authentication (log-off).

Figure 9:
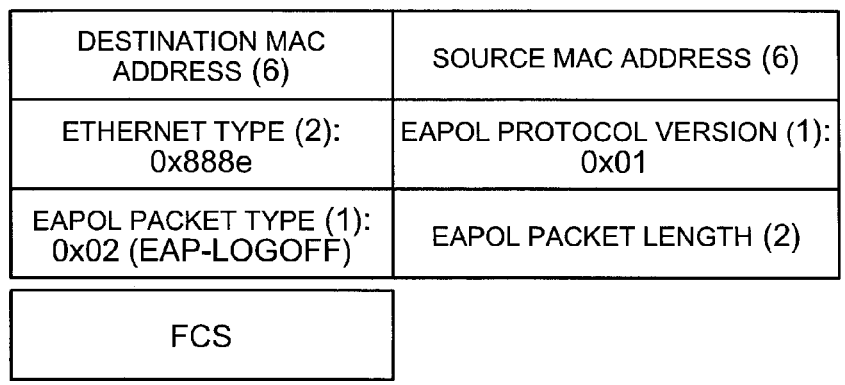
FIG. 9 is a diagram showing an example structure of an EAPOL-Logoff frame.

First, the PC 200 sends an EAPOL-Logoff frame to the infrastructure switch 400 (step S801). As indicated in FIG. 9, the EAPOL-Logoff frame includes a destination MAC address, a source MAC address, an Ethernet type, the version of the EAPOL protocol, an EAPOL packet type, an EAPOL packet length, and the FCS.

In the EAPOL-Logoff frame, the destination MAC address is the MAC address of the infrastructure switch 400, and the source MAC address is the MAC address of the PC 200. The Ethernet type is "0x888e", which indicates EAPOL. The version of the EAPOL protocol is always "0x01". The EAPOL packet type is "0x02", which indicates EAPOL-Logoff. The EAPOL length is the length of the EAPOL frame. The FCS is used to check the Ethernet frame.

In FIG. 8, when the PC interface unit 102 of the IP telephone terminal 100 receives the EAPOL-Logoff frame, the switching unit 110 transfers the frame to the infrastructure interface unit 101. At this point, the judging unit 112 judges that this frame is an EAPOL-Logoff frame by referring to the header of the frame or the like. The judging unit 112 thereby recognizes that the user having the user ID stored in the storage unit 130 is logged off (step S802).

The EAPOL-Logoff frame transferred to the infrastructure interface unit 101 is sent to the infrastructure switch 400 (step S803). The infrastructure switch 400 that receives this frame denies the grant of the network access for the PC 200.

At step S802, the judging unit 112 that recognizes the user's log-off notifies the controlling unit 127 that the user is logged off. The controlling unit 127 sends the SIP message processing unit 123 an instruction of deleting the SIP address registered at the time of the 802.1X authentication. In response to the instruction, the SIP message processing unit 123 creates a SIP-Register-Request message for deleting the registered SIP address (step S804). Then, the SIP message processing unit 123 sends the created SIP-Register-Request message to the SIP server 600 (step S805).

When receiving the SIP-Register-Request message, the SIP server 600 deletes the designated SIP address, and sends the SIP Register-Response message to the IP telephone terminal 100 in response (step S806).

When the SIP Register-Response message is received, the controlling unit 127 deletes the user ID from the storage unit 130 (step S807), and the SIP address deleting process is terminated.

With the above sequence, when the user of the PC 200 is logged off, the SIP address deleting process can be implemented to terminate the use of the IP telephone terminal 100 at the same time.

With the IP telephone terminal according to the first embodiment, the user ID that identifies the user of the PC can be acquired from the authentication message sent by a PC that mediates the connection to the network. When the authentication is successfully made, a SIP address created from the acquired user ID is registered with the SIP server. In other words, when the user connects the PC to the system by way of the IP telephone terminal and executes the network access authenticating process for the PC by operating the PC, the SIP address registering process that is necessary for the user to use the IP telephone terminal is executed at the same time. In this manner, the operation required of the user when starting using the PC and the IP telephone terminal can be simplified.

According to the first embodiment, it is assumed that the user ID used for the PC authentication and the SIP address used for the IP telephone terminal are the same, or that the SIP address created, for example, by taking a domain from the user ID can be used as the SIP address of the IP telephone terminal.

An IP telephone terminal according to a second embodiment acquires a SIP address that corresponds to the user ID from an external server and, by use of the acquired SIP address, the registration of a SIP address is executed to use the IP telephone terminal. This makes the SIP address registration for the IP telephone terminal executable along with the PC authentication, even when a SIP address for the IP telephone terminal cannot be generated on the IP telephone terminal from the user ID for the PC authentication.

Figure 10:
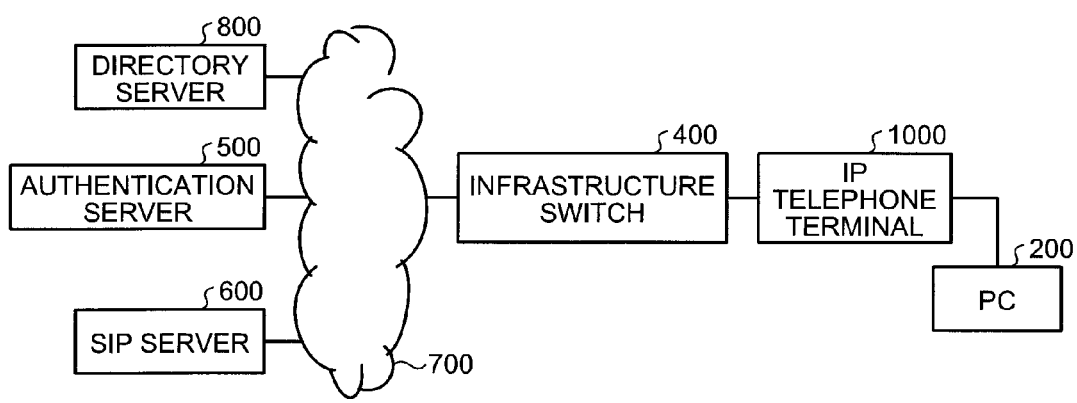
FIG. 10 is a diagram showing a network structure of an IP telephone system according to a second embodiment of the present invention.

As shown in FIG. 10, an IP telephone system according to the second embodiment includes an IP telephone terminal 1000, the PC 200, the infrastructure switch 400, the authentication server 500, the SIP server 600, and a directory server 800.

The second embodiment is different from the first embodiment in the incorporation of the directory server 800 and also in the function of the IP telephone terminal 1000. The rest of the structure and functions is the same as the IP telephone system according to the first embodiment as illustrated in FIG. 1. The same components are therefore provided with the same numerals, and the explanation thereof is omitted.

The directory server 800 manages the information on the user ID of the user of the PC 200 and the SIP address for the IP telephone terminal 1000 in association with each other. The external devices such as the IP telephone terminal 1000 can send a message requesting a SIP address that corresponds to the user ID to the directory server 800 based on a directory access protocol such as the LDAP, and acquire the SIP address from a reply message thereto.

Figure 11:
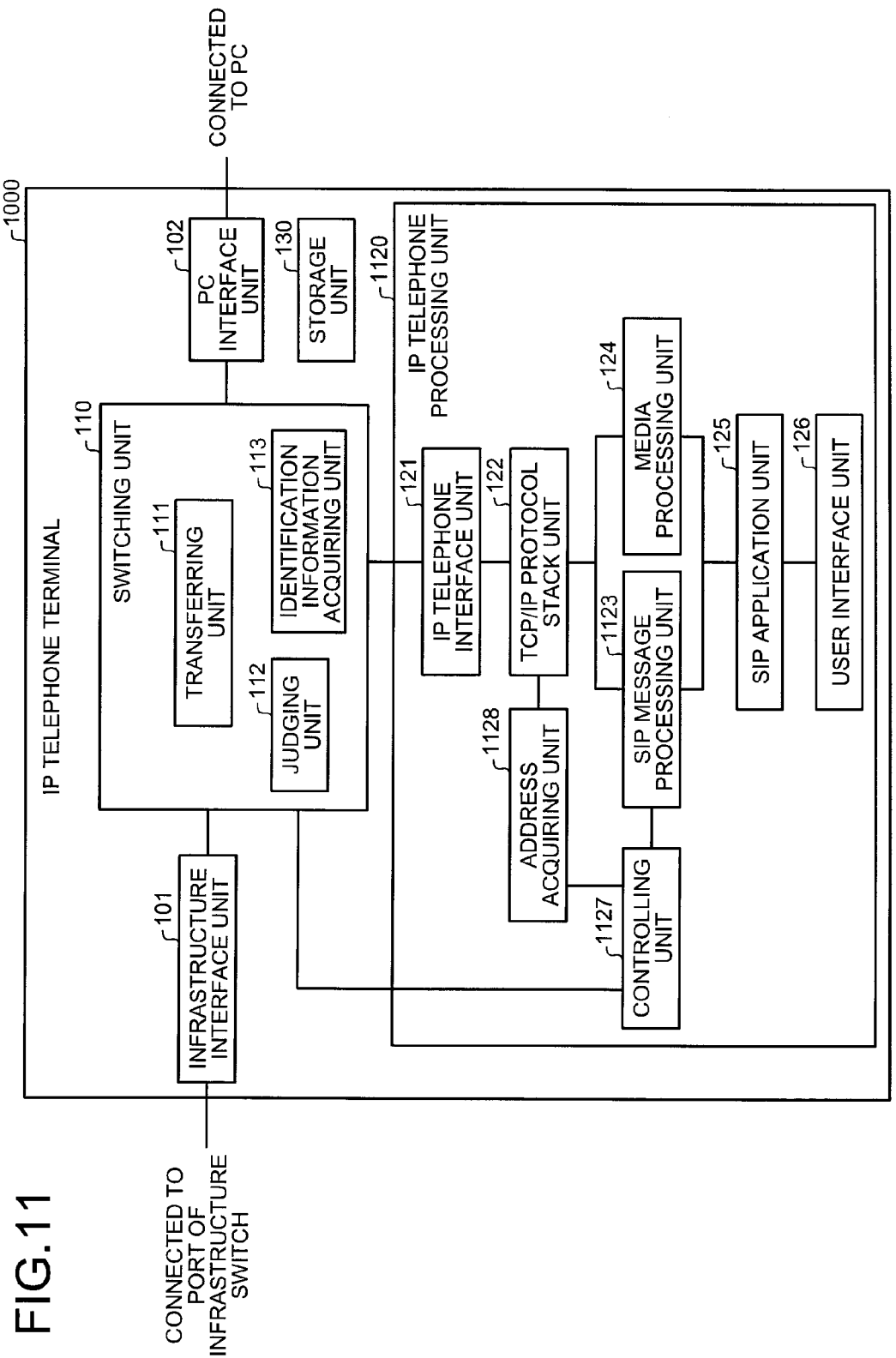
FIG. 11 is a block diagram showing a detailed structure of an IP telephone terminal according to a second embodiment.

Next, the function and structure of the IP telephone terminal 1000 is explained in detail below. As illustrated in FIG. 11, the IP telephone terminal 1000 includes the infrastructure interface unit 101, the PC interface unit 102, the switching unit 110, an IP telephone processing unit 1120, and the storage unit 130.

The second embodiment is different from the first embodiment in the functions of a SIP message processing unit 1123 and a controlling unit 1127, and the incorporation of an address acquiring unit 1128 in the IP telephone processing unit 1120. The rest of the structure and the function is the same as the IP telephone system according to the first embodiment as illustrated in FIG. 3. Thus, the same components are provided with the same numerals, and the explanation thereof is omitted.

The controlling unit 1127 notifies the address acquiring unit 1128, which will be described later, of the user ID of an authenticated user of the PC 200 when the user is allowed to have network access in the 802.1X authentication. The controlling unit 1127 acquires a SIP address corresponding to this user ID from the address acquiring unit 1128. The controlling unit 1127 notifies the SIP message processing unit 1123 of the acquired SIP address and instructs the SIP message processing unit 1123 to create a SIP message. These additional functions differentiate the controlling unit 1127 from the controlling unit 127 according to the first embodiment.

The SIP message processing unit 1123 is differentiated from the SIP message processing unit 123 according to the first embodiment in that the SIP message is created based on the SIP address received from the controlling unit 1127.

The address acquiring unit 1128 acquires, when the controlling unit 1127 notifies the address acquiring unit 1128 of the user ID, the SIP address corresponding to this user ID from the directory server 800 in accordance with a directory access protocol such as the LDAP by use of the TCP/IP protocol stack unit 122.

Figure 12:
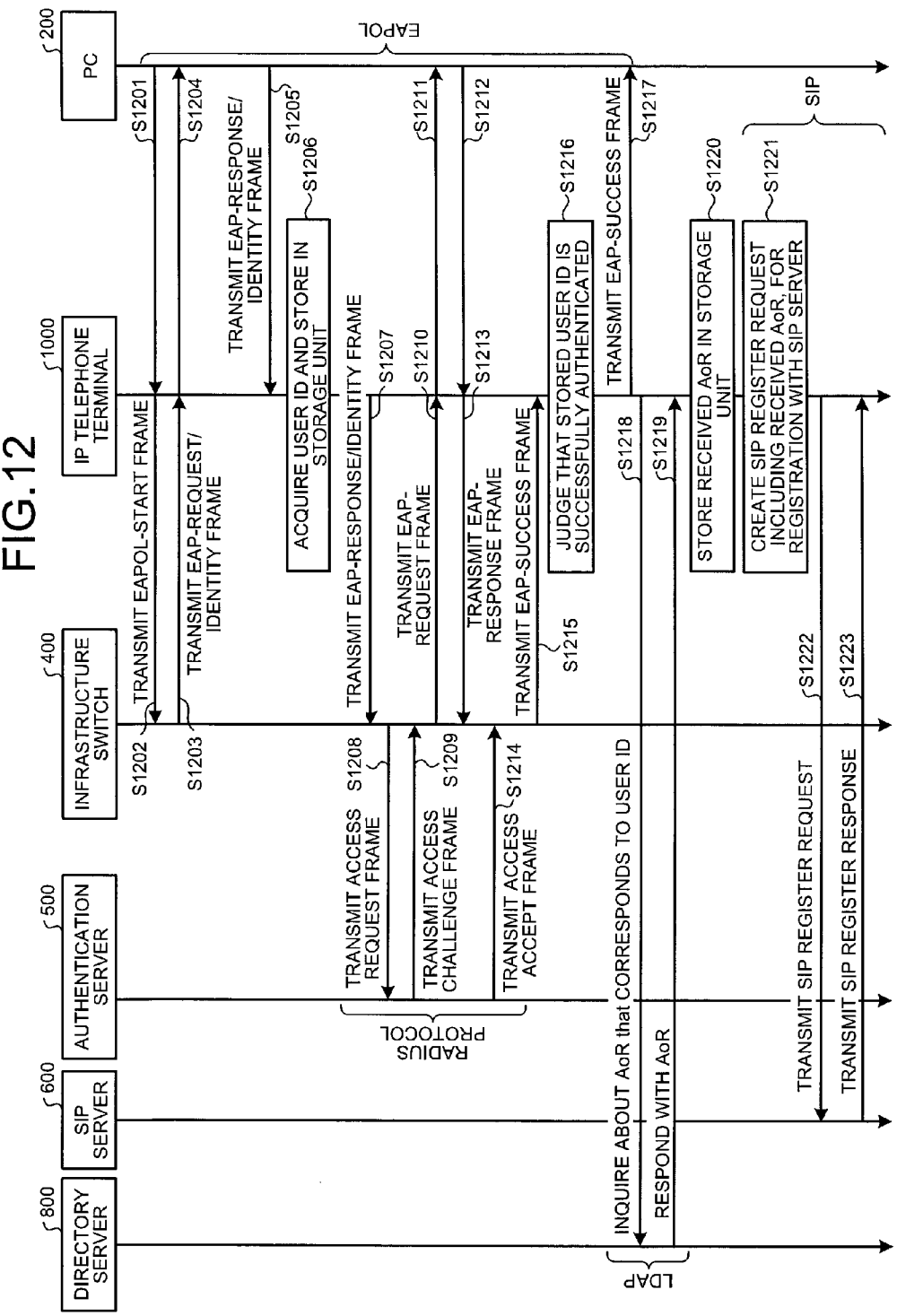
FIG. 12 is a flowchart of a SIP address registering process according to the second embodiment.

The SIP address registering process performed by the IP telephone terminal 1000 according to the second embodiment is explained below with reference FIG. 12.

The EAPOL packet exchanging process of steps S1201 through S1217 are the same as the process of steps S401 through S417 performed by the IP telephone terminal 100 according to the first embodiment. The explanation is therefore omitted.

When it is judged at step S1216 that the user is authenticated, the controlling unit 1127 notifies the address acquiring unit 1128 of the user ID, and instructs the address acquiring unit 1128 to inquire about the SIP address. In response to the instruction from the controlling unit 1127, the address acquiring unit 1128 sends an inquiry to the directory server 800 about the SIP address (AoR) that corresponds to the user ID (step S1218).

In response to the inquiry, the directory server 800 returns the AoR corresponding to the designated user ID to the IP telephone terminal 1000 (step S1219).

The address acquiring unit 1128 notifies the controlling unit 1127 of the AoR received from the directory server 800. Then, the controlling unit 1127 stores the received AoR in the storage unit 130 (step S1220). Furthermore, the controlling unit 1127 notifies the SIP message processing unit 1123 of the received AoR and instructs the SIP message processing unit 1123 to register the SIP address.

In response to the instruction from the controlling unit 1127, the SIP message processing unit 1123 creates the SIP Register Request message that includes the received AoR (step S1221).

The SIP message transmitting and receiving process of steps S1222 and S1223 is the same as the process of steps S419 and S420 performed by the IP telephone terminal 100 according to the first embodiment. Thus, the explanation thereof is omitted.

With the above sequence, even when the user ID and the SIP address are different from each other, the SIP address registration that makes the IP telephone terminal 1000 available can be conducted at the same time of the 802.1X authentication for the PC 200.

Figure 13:
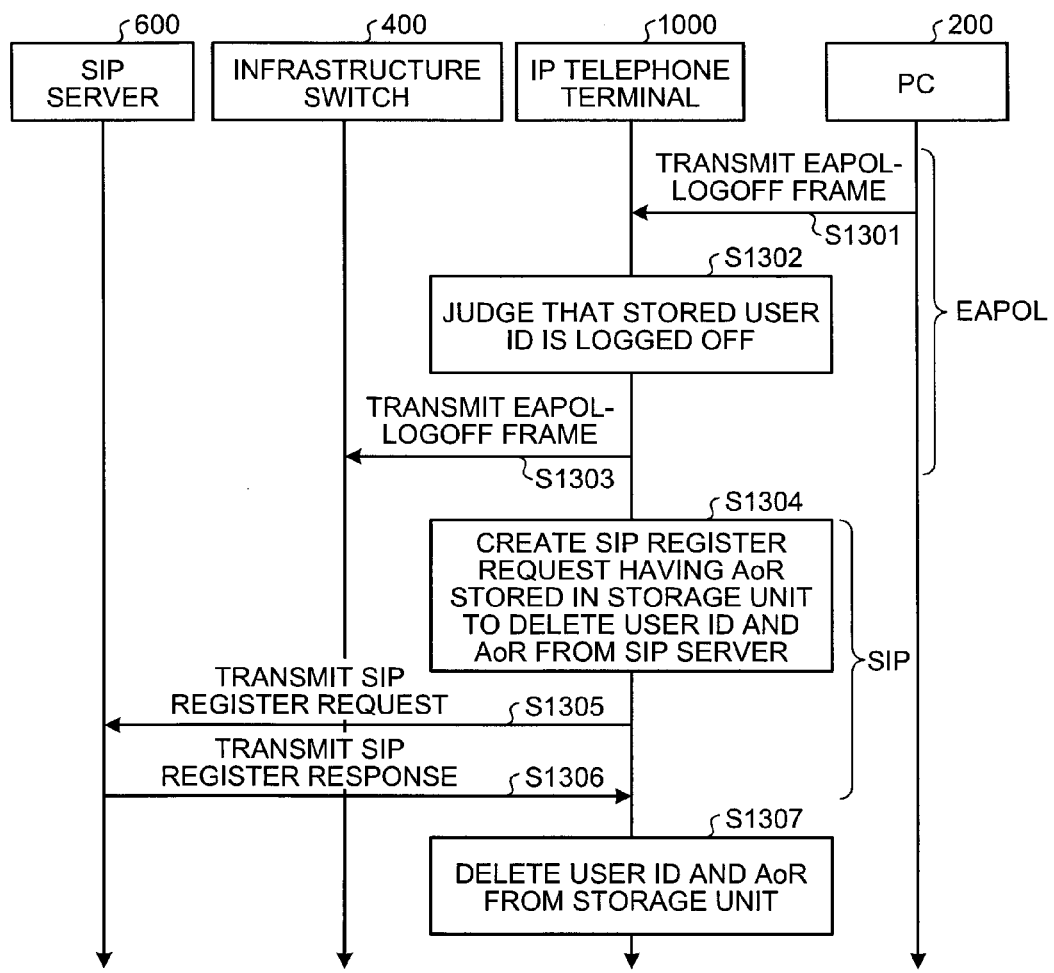
FIG. 13 is a sequence diagram showing an overview of a SIP address deleting process according to the second embodiment.

The SIP address deleting process performed by the IP telephone terminal 1000 according to the second embodiment is now explained with reference to FIG. 13.

The EAPOL frame transmitting process of steps S1301 through S1303 is the same as the process of steps S801 through S803 performed by the IP telephone terminal 100 according to the first embodiment, and thus the explanation thereof is omitted.

When it is judged that the user is logged off, the SIP message processing unit 1123 creates a SIP-Register-Request message to delete the registered SIP address, in response to the instruction from the controlling unit 1127 (step S1304). According to the present embodiment, the SIP message processing unit 1123 creates a SIP-Register-Request message that includes the AoR stored in the storage unit 130.

The SIP message transmitting and receiving process of steps S1305 and S1306 is the same as the process of step S805 and step S806 performed by the IP telephone terminal 100 according to the first embodiment, and thus the explanation thereof is omitted.

When the SIP Register-Response message is received, the controlling unit 1127 deletes the user ID and the AoR from the storage unit 130 (step S1307), and the SIP address deleting process is terminated.

The IP telephone terminal according to the second embodiment can acquire the SIP address corresponding to the user ID from an external server and executes the SIP address registration, which makes the IP telephone terminal available, by use of the acquired SIP address. Hence, even if the correspondence between the user ID for the PC authentication and the SIP address for the IP telephone terminal is managed by an external server, the SIP address registration can be conducted at the same time of the PC authentication.

According to the present embodiment, the PC 200 performs the network access authentication with the infrastructure switch 400 in accordance with the 802.1X. An applicable authentication protocol is not limited thereto, however. For example, the PANA, which incorporates the EAP in a similar manner to the 802.1X, may be adopted as an authentication protocol.

A modification example adopting the PANA as an authentication protocol is explained below. In this example, the PC 200 executes the EAP-based access authentication with a layer-3 infrastructure switch or an authentication agent. Further, the frame format monitored by the IP telephone terminal is changed to a UDP packet.

When the structure adopts the PANA, the PC 200 exchanges authentication messages (PANA protocol messages) with a PANA authentication agent (not shown) in place of the infrastructure switch 400. Further, when the PANA is adopted, the PC 200 notifies the PANA authentication agent of the identity information by using EAP-Type-Data included in the EAP-PayloadAVP of the PANA-Auth-Request Message.

Figure 14:
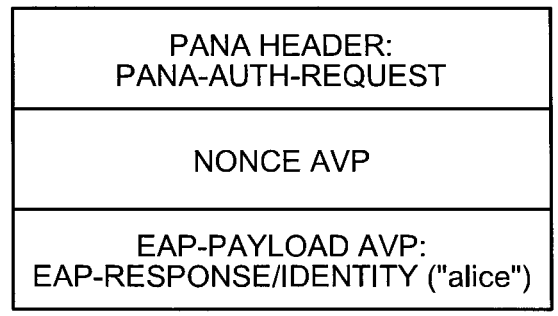
FIG. 14 is a diagram showing an example structure of a PANA protocol message.

The IP telephone terminal identifies the user ID of the user who uses the PC 200 by monitoring the message. FIG. 14 is a diagram showing an example structure of the PANA protocol message that is a monitoring target in the detection of the user ID.

When the PANA is adopted, the PANA authentication agent uses the PANA-Auth-Request Message for the notification of the authentication result of the PC 200. For example, when the authentication of the PC 200 is successfully made, PANA_SUCCESS is entered as a value of the Result-Code AVP in the PANA-Auth-Request Message.

Figure 15:
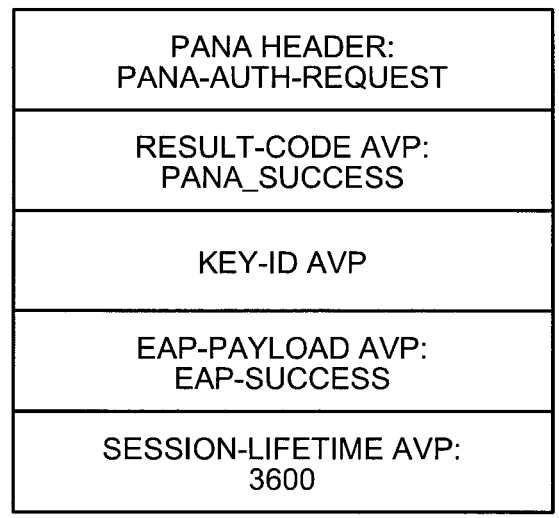
FIG. 15 is a diagram showing an example structure of a PANA protocol message.

The IP telephone terminal judges whether the user of the PC 200 is authenticated, by monitoring the message. FIG. 15 is a diagram for showing an example structure of the PANA protocol message that is a monitoring target when the authentication result is judged. This message contains, as the SessionLifetime AVP, a value that denotes an effective period of the PANA session in seconds.

The PANA header includes a Session Identifier as an ID that uniquely identifies a single PANA session. For this reason, when the structure adopts the PANA, the PANA Session Identifier may be used to judge whether the user ID of the user of the PC 200 corresponds to the authentication result.

As described above, the IP telephone terminal determines the user authentication result by monitoring this message, and also specifies the authentication period based on the message when the authentication is successfully made. Thus, when the SIP Register Request message is created for the SIP address registration, the same length of period as the specified PANA authentication period may be set to the parameter of the Contact header, "expires", which indicates the registration effective period.

Figures 16, 17:
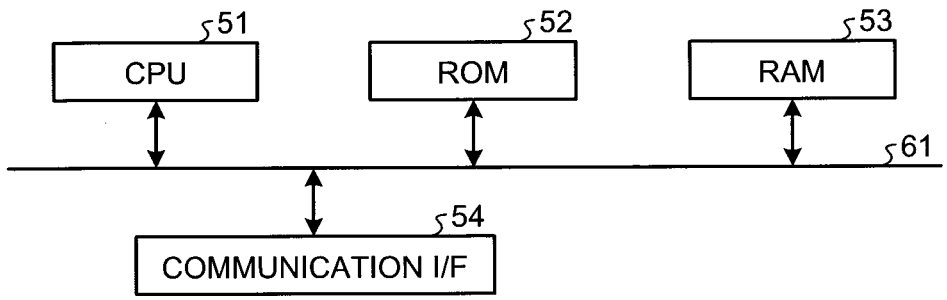
FIG. 16 is a diagram showing an example structure of a SIP Register-Request message.
FIG. 17 is a diagram explaining a hardware structure of the IP telephone terminal according to the first or second embodiment.

FIG. 16 is a diagram for showing an example structure of the SIP Register-Request message in which the effective period is set. This structure is differentiated from the structure of the example message illustrated in FIG. 7 in that the "expires" parameter of the Contact header is set to the effective period of the registration (3600 seconds).

By setting the effective period in this manner, the authentication period for the SIP address of the IP telephone terminal can be maintained at the same length as the authentication period for the PC 200. As a result, even if, for example, the PC 200 is taken away without a log-out operation, the authentication period of the SIP address expires when the authentication period for the PC 200 is terminated.

The hardware structure of the IP telephone terminal according to the first and second embodiments is explained with reference to FIG. 17.

The IP telephone terminal according to the first and second embodiments includes a control device such as a central processing unit (CPU) 51, memory devices such as a read only memory (ROM) 52 and a RAM 53, a communication interface 54 connected to a network to conduct communications, and a bus 61 connecting these components to one another.

According to the first and second embodiments, an address registering program executed by the IP telephone terminal is installed in the ROM 52 or the like in advance.

According to the first and second embodiments, the address registering program executed by the IP telephone terminal may be stored in the form of an installable or executable file in a computer-readable recording medium such as a compact disk read only memory (CD-ROM), a flexible disk (FD), a compact disk recordable (CD-R), and a digital versatile disk (DVD).

According to the first and second embodiments, the address registering program executed by the IP telephone terminal may be stored in a computer connected to a network such as the Internet and downloaded via the network. Furthermore, according to the first and second embodiments, the address registering program executed by the IP telephone terminal may be provided or distributed via a network such as the Internet.

In the address registering program executed by the IP telephone terminal according to the first and second embodiments, the above units (the switching unit and the IP telephone processing unit) are formed as a module. As an actual hardware structure, the CPU 51 reads the address registration program from the ROM 52 and executes the program, and thereby the units are loaded and generated on the main storage device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An IP telephone terminal that meditates a connection between an external terminal used by a user and a network and that offers a user-specific IP telephone function to the user when address information of the user is registered with a server apparatus connected by way of the network, the IP telephone terminal comprising:
    a transferring unit that transfers a message received from the external terminal or the network to a destination address designated in the received message;
    a first judging unit that monitors messages transferred between the external terminal and the network by way of the transferring unit and that judges whether an authentication message, that is used for authentication of the user of the external terminal and includes identification information of the user, is transferred from the external terminal to the network by way of the transferring unit;
    an identification information acquiring unit that acquires the identification information from the authentication message when the authentication message is transferred by way of the transferring unit;
    a second judging unit that monitors messages transferred between the external terminal and the network by way of the transferring unit and that judges whether a grant message indicating that the user is authenticated is transferred from the network to the external terminal by way of the transferring unit;
    a message processing unit that, when the second judging unit determines that the grant message is transferred to the external terminal by way of the transferring unit, creates a registration message including the address information of the user having the acquired identification information and transmits the registration message to the server apparatus; and
    an IP telephone function enabling unit that enables the user to use the user-specific IP telephone function when receiving, from the server apparatus, an acknowledgement message of the registration message created by the message processing unit.

2. The terminal according to claim 1, wherein, when the grant message is transferred, the message processing unit creates address information including the acquired identification information, creates the registration message including the created address information, and transmits the registration message to the server apparatus.

3. The terminal according to claim 1, further comprising an address acquiring unit that
    transmits a request message requesting the address information corresponding to the acquired identification information to a managing apparatus that is connected by way of the network and manages the identification information and the address information in association with each other, and
    acquires the address information returned by the managing apparatus in response to the request message,
    wherein the message processing unit creates the registration message including the acquired address information and transmits the registration message to the server apparatus.

4. The terminal according to claim 1, wherein
    the first judging unit judges whether the authentication message in accordance with IEEE 802.1 X is transferred; and
    the second judging unit judges whether the grant message in accordance with the IEEE 802.1X is transferred.

5. The terminal according to claim 1, wherein
    the first judging unit judges whether the authentication message in accordance with PANA (Protocol for Carrying Authentication for Network Access) is transferred; and
    the second judging unit judges whether the grant message in accordance with the PANA is transferred.

6. The terminal according to claim 1, further comprising a third judging unit that judges whether a notification message notifying that the authentication of the user of the external terminal is expired is transferred by way of the transferring unit,
    wherein, when the notification message is transferred by way of the transferring unit, the message processing unit creates a delete message that includes to-be-deleted address information to delete from the server apparatus the address information of the user having the acquired identification information, and transmits the delete message to the server apparatus.

7. The terminal according to claim 1, wherein
    the server apparatus is capable of registering an effective period of the address information,
    the first judging unit judges whether the authentication message that includes an authentication period during which the authentication is effective and the identification information of the user is transferred;
    the identification information acquiring unit acquires the identification information and the authentication period from the authentication message when the authentication message is transferred, and
    the message processing unit creates, when the grant message is transferred, the registration message to register the address information of the user having the acquired identification information with the server apparatus by adopting, for the effective period, the acquired authentication period, and transmits the registration message to the server apparatus.

8. The terminal according to claim 1, wherein the registration message is a SIP Register message that includes the address information, which is an address of record (AoR) of the user having the identification information.

9. An address registering method executed by an IP telephone terminal that mediates a connection between an external terminal used by a user and a network and that offers a user-specific IP telephone function to the user when address information of the user is registered with a server apparatus connected by way of the network, the method comprising:
  transferring a message received from the external terminal and the network to a destination address designated in the received message;
  monitoring messages transferred between the external terminal and the network;
  judging whether an authentication message, that is used for authentication of the user of the external terminal and includes identification information of the user, is transferred from the external terminal to the network;
  acquiring the identification information from the authentication message when the authentication message is transferred;
  judging whether a grant message indicating that the user is authenticated is transferred from the network to the external terminal;
  creating a registration message that includes the address information to be registered, including the address information of the user having the acquired identification information and and transmitting the registration message to the server apparatus when it is determined that the grant message is transferred to the external terminal; and
  enabling the user-specific IP telephone function when Receiving an acknowledgement message of a created registration message from the server apparatus.

10. A computer program product having a non-transitory computer readable medium including programmed instructions for mediating a connection between an external terminal used by a user and a network and for offering a user-specific IP telephone function to the user when address information of the user is registered with a server apparatus connected by way of the network, wherein the instructions, when executed by a computer, cause the computer to perform:
  transferring a message received from the external terminal and the network to a destination address designated in the received message;
  monitoring messages transferred between the external terminal and the network;
  judging whether an authentication message, that is used for authentication of the user of the external terminal and includes identification information of the user, is transferred from the external terminal to the network;
  acquiring the identification information from the authentication message when the authentication message is transferred;
  judging whether a grant message indicating that the user is authenticated is transferred from the network to the external terminal;
  creating a registration message that includes the address information to be registered, including the address information of the user having the acquired identification information, and transmitting the registration message to the server apparatus when it is determined that the grant message is transferred to the external terminal; and
  enabling the user to use the user-specific IP telephone function when receiving an acknowledgement message of a created registration message from the server apparatus.

* * * * *